(12) United States Patent
Putnam et al.

(10) Patent No.: US 6,735,832 B1
(45) Date of Patent: May 18, 2004

(54) PROCESS TO PRODUCE IMAGED SCRIM COMPOSITE NONWOVEN AND PRODUCT THEREOF

(75) Inventors: Michael J. Putnam, Fuquay-Varina, NC (US); Cindy K. Gilbert, Raleigh, NC (US)

(73) Assignee: Polymer Group, Inc., North Charleston, SC (US)

( * ) Notice: Subject to any disclaimer, the term of this patent is extended or adjusted under 35 U.S.C. 154(b) by 0 days.

(21) Appl. No.: 09/587,419

(22) Filed: Jun. 1, 2000

(51) Int. Cl.[7] .................................................. D04H 5/02
(52) U.S. Cl. ...................................................... 28/104
(58) Field of Search .......................... 28/104, 105, 167, 28/163, 106, 103, 158; 156/148; 442/35, 36, 381, 382, 384, 389, 408

(56) References Cited

U.S. PATENT DOCUMENTS

| | | | |
|---|---|---|---|
| 3,485,706 A | 12/1969 | Evans | |
| 4,775,579 A | 10/1988 | Hagy et al. | |
| 5,098,764 A | 3/1992 | Drelich et al. | |
| 5,136,761 A | * 8/1992 | Sternlieb et al. | 28/104 |
| 5,334,446 A | 8/1994 | Quantrille et al. | |
| 5,393,599 A | 2/1995 | Quantrille et al. | |
| 5,413,849 A | * 5/1995 | Austin et al. | 28/104 |
| 5,431,991 A | 7/1995 | Quantrille et al. | |
| 5,736,219 A | 4/1998 | Suehr et al. | |
| 5,822,833 A | 10/1998 | James et al. | |
| 5,827,597 A | 10/1998 | James et al. | |
| 5,874,159 A | 2/1999 | Cruise et al. | |
| 6,063,717 A | * 5/2000 | Ishiyama et al. | 442/387 |
| 6,314,627 B1 | * 11/2001 | Ngai | 28/104 |

OTHER PUBLICATIONS

Joseph, Marjory L., "Introductory Textile Science", 1986, CBS College Publishing: Holt, Rinehart and Winston, Fifth Edition, pp. 260–261.*

* cited by examiner

Primary Examiner—Amy B. Vanatta
(74) Attorney, Agent, or Firm—Wood, Phillips, Katz, Clark & Mortimer

(57) ABSTRACT

A nonwoven composite fabric having first and second fibrous layers reinforced by an intermediate scrim layer. The first fibrous layer may be an entangled fabric formed of staple length fibers or continuous filaments, and the second fibrous layer may be a thermally point-bonded fabric formed of staple length fibers or continuous filaments. The second fibrous layer bonds the scrim to the first fibrous layer and will mask the scrim in the finished product. The composite fabric is produced by placing the scrim in face-to-face juxtaposition with the first and second fibrous layers, and subjecting the resulting composite to the forces of high pressure fluid jets to break the bonds in the second fibrous layer and to cause the fibers or filaments of that fibrous layer to pass through the openings in the scrim and become entangled with the fibers or filaments of the first fibrous layer.

8 Claims, 5 Drawing Sheets

SECT. A-A

SECT. B-B

SECT. A-A

Cross cut photomicrograph of MP-0202-1 showing black spunbond fibers penetrating through web.
File: cross1
Photomicrograph showing black spunbond fibers penetrating through the white web.
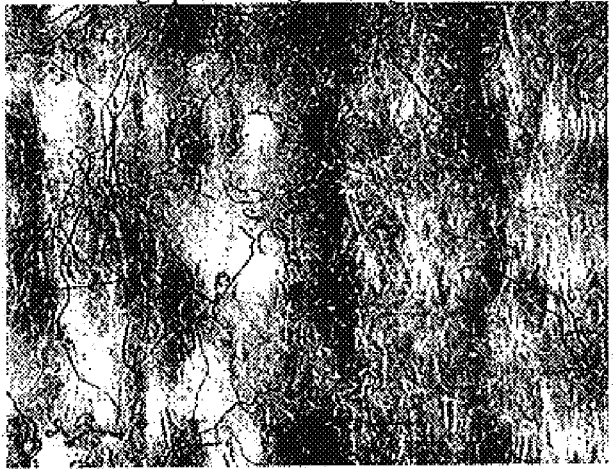
File: white1

PROCESS TO PRODUCE IMAGED SCRIM COMPOSITE NONWOVEN AND PRODUCT THEREOF

BACKGROUND OF THE INVENTION

It has long been desired to produce nonwoven fabrics that combine the low cost of nonwoven manufacturing process with the durability of traditional knit and woven textiles to multiple uses and repeated launderings. However, to date, expedients that have been proposed for increasing the durability of nonwoven fabrics have achieved only partial success in terms of performance enhancements. Further, such approaches have been costly and have resulted in detrimental effects on tactile and drape properties, to render the modified fabrics no longer suitable for their intended end use.

The use of open mesh nets, or scrims, has been proposed in the past for altering certain physical characteristics of nonwoven fabrics, such as tensile strength and durability. Scrims are produced by numerous methods including weaving, extrusion casting, cross-laying threads or filaments and bonding at their intersections. U.S. Pat. Nos. 4,775,579; 5,334,446; 5,393,599; 5,431,991; and 5,874,159 all disclose nonwoven fabrics having an open mesh net member incorporated therein. A scrim layer is typically bonded between fibrous layers to form a nonwoven product to suit a particular application. Scrim layers have been proposed as a stiffener, for strengthening reinforcement, to make non-elastic or highly elastic products; and for a variety of other purposes.

Many different expedients have been proposed for bonding a scrim layer into a multi-layer nonwoven product. Thermal bonding, adhesive bonding, stitch bonding, and high-pressure water jet entanglement are typical methods for constructing scrim reinforces laminates. None of these expedients has been completely successful. Adhesive bonding involves specialized equipment, adds a processing step, and adhesive itself is expensive. Thermal bonding results in stiffening of the fabric due to the stiffness of the bond points themselves, which results in an undesirable tactile quality in many durable good end uses. Stitch bonding, while aesthetically pleasing, is slow by comparison to most other nonwoven bonding methods and includes the cost of expensive yarns, thereby negating the economic benefits of the original nonwoven substrate. Bonding by high-pressure water jets typically requires the use of layers of unbonded staple fibers to conceal the scrim as an interior layer in the fabric. Hydroentangled staple layers tend to lack the type of durability and pill resistance required for highly durable, multi-use fabrics without the inclusion of expensive finishes, which also add cost and have negative effects on hand and drape.

Thus, there remains an unfilled need for the production of a highly durable nonwoven product with the high strength performance that can be reliably and economically manufactured.

SUMMARY OF THE INVENTION

The present invention comprises a composite nonwoven fabric based on a multi-layered construction utilizing a scrim as an interior strength bearing member with nonwoven fabrics as the outer layers of a fabric that may be first consolidated by the use of high pressure water jets and then imaged using water jets and a three dimensional forming surface.

In accordance with one aspect of the present invention the scrim layer is positioned between a thermally point-bonded nonwoven substrate fabric formed of polymeric staple length fibers or essentially continuous filaments, and a secondary substrate fabrics of entangled polymeric staple length fibers or essentially continuous filaments. This precursor composite is then directed to an imaging device which is subjected to the action of high pressure water jets to consolidate the layers of the precursor composite to one another and to impart an image therein corresponding to the image of the imaging device. U.S. Pat. Nos. 5,882,883 and 5,827,597 disclose processes and equipment that are suitable for use in forming imaged laminated nonwoven fabrics of the present invention, and such patents are hereby incorporated herein in their entireties by this reference.

The reliance upon a thermally point bonded nonwoven substrate as one of the layers of the composite contributes to the abrasion resistance and overall durability of the composite fabric. The inclusion of an entangled fabric of predominantly staple length fibers provides added bulk, coverage, and imparts a good hand to the composite fabric. The resulting composite construction offers excellent strength, uniformity, opacity, durability and aesthetic properties in a nonwoven fabric.

In accordance with another aspect of the present invention, prior to imaging, the entangled nonwoven substrate layer is comprised of staple length fibers or continuous filaments that are held together by knotting or mechanical friction as a result of needling or water jet entangling. Such fabrics are produced, for example, by cross-lapping a carded fibrous layer of randomized 0.8 to 3.5 denier staple length fibers. The carded web is subsequently entangled using commercial processes, most preferentially hydroentanglement systems, as exemplified by Perfojet Jetlace 2000 or Fleissner Aquajet system. When continuous filament fabrics are used, thermoplastic continuous filaments of 0.8 to 3.5 denier, comprised of thermoplastic polymers such as polyester, polyamide, polypropylene or polyethylene, are preferred. Such fibrous layers have a basis weight in the range of 15 to 100 grams per square meter (gsm). Various prior art patents disclose techniques for manufacturing nonwoven fabrics by hydroentanglement of staple length fibers, including U.S. Pat. No. 3,485,706, the disclosure of which is hereby incorporated herein by this reference. While having achieved substantial commercial success, it is well known that such fabrics have relatively low tensile strength and poor elongation properties. However, it has been discovered that when such fabrics are incorporated into a composite that includes a scrim reinforcing layer, and a thermally point-bonded layer, and that composite is imaged by the high pressure water jets, the physical properties of the resulting laminate are greatly enhanced.

In accordance with another aspect of the invention, the thermally point-bonded fabric performs a number of functions; to increase the basis weight of the composite fabric, to bond the entangled fibrous layer to the scrim, and to further conceal the interior scrim layer. As the coarseness of the scrim increases, correspondingly, the basis weight of the thermal bond layer will be increased. Basis weights in the range of 20 to 100 gsm are generally sufficient to bond the substrate layers of the composite fabric and to mask the internal scrim layer. Suitable deniers for the fibers or filaments are in the range of 0.8 to 4.0.

The thermally bonded substrate layer is produced on a conventional manufacturing line, such as a card line or spunbond line as is well known. The consolidation step in the process may be any of the known methods of thermal bonding, including through-air bonding and thermal point bonding, with the latter being most preferred. The degree of bonding in such commercial processes is generally sufficient to provide the strength and durability required by the intended end use, as well as that required by the intermediate operations, such as winding, slitting and other converting steps. In accordance with the present invention, the degree of bonding must be such that the fabric can be processed through the required intermediate steps but labile enough to break under the action of the high-pressure water jets. This is required so that the fibers or filaments entangle with the fibers of the entangled fibrous layer by extending through the scrim layer. This is achieved during the imaging step and serves to consolidate the layers of the composite while producing the final desired aesthetics of the fabric of the invention.

The present invention contemplates that different forms of scrim materials may be used, depending on the anticipated end use of the laminated nonwoven fabric. The stiffness of the composite can be controlled by the properties of the scrim layer where a heavy, coarse polypropylene scrim will produce a stiff composite fabric. Metallic scrims produce composite fabrics that have substantial bending memory and high electrical conductivity. Cast lightweight polyester scrims can be used to produce non-elastic imaged products suitable for jet dyeing. Elastic scrims can be used when some degree of stretch and recovery is desired in the final fabric. The required fabric properties for a given end use application will be considered when selecting the type of scrim used in the composite fabric designs of the present invention.

The above description sets forth rather broadly the more important features of the present invention so that the detailed description that follows may be better understood, and so that the present contributions to the art my be better appreciated. It is to be understood that there are additional features of the disclosure that will be described hereinafter which will form the subject matter of the claims appended hereto. In this respect, before explaining the several embodiments of the disclosure in detail, it is to be understood that the disclosure is not limited in its application to the details of the construction and the arrangements set forth in the following description or illustrated drawings. The present invention is capable of other embodiments, of being practiced, and carried out in various ways, as will be appreciated by those skilled in the art. In addition, it is to be understood that the phraseology and terminology employed herein are for description and not limitation.

BRIEF DESCRIPTION OF THE DRAWINGS

FIG. 5 is a cross-section photomicrograph of a composite fabric of the invention, showing black filaments from a thermally bonded substrate layer penetrating the scrim to entangle with fibers from a entangled substrate layer after imaging; and FIG. 6 is a top plan view of a composite fabric of the invention, as shown in FIG. 5, where the black fibers from a thermally bonded layer have penetrated to the opposite surface of the composite fabric after imaging.

DETAILED DESCRIPTION

Figure 1:
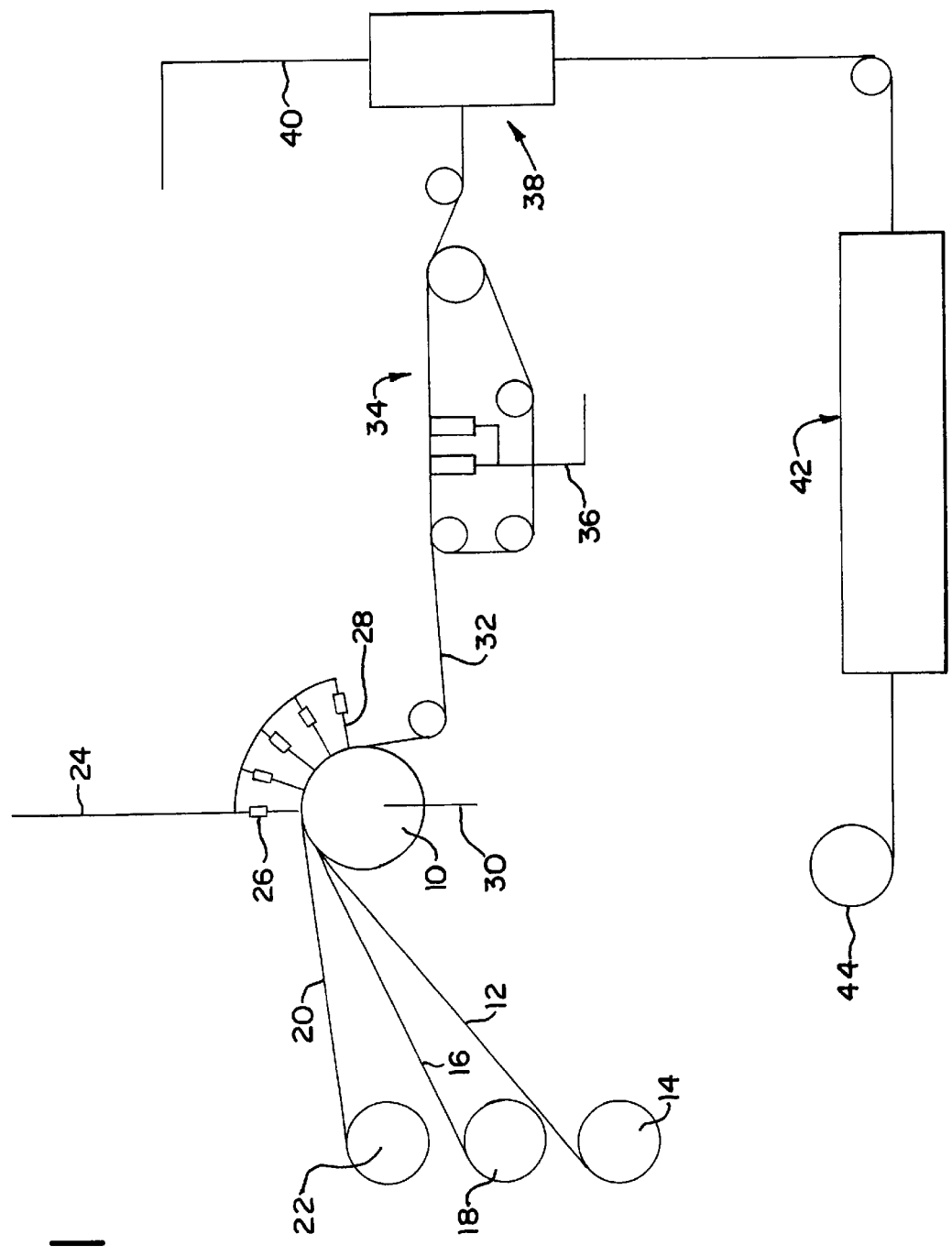
FIG. 1 is a schematic view of one embodiment of the invention.

Turning now to the drawings, FIG. 1 illustrates a first embodiment of the process of the present invention, wherein an image transfer device 10 of the type illustrated and described in detail in U.S. Pat. Nos. 5,822,833 and 5,827,597 is shown. An entangled fibrous layer 12 from roll 14 is fed to image transfer device 10 in contact with the outer surface thereof. A scrim layer 16 from roll 18 is fed to image transfer device 10 in contact with entangled fibrous layer 12. A thermally bonded fibrous layer 20 from roll 22 is fed to image transfer device 10 in contact with the outwardly directed surface of scrim layer 16.

High pressure water from line 24 is fed to circumferentially spaced high pressure water jets 26 spaced radially outwardly from image transfer device 10 and from the outer surface of thermally bonded fibrous layer 20. Five rows of high pressure water jets 26 are illustrated, and the high pressure water streams 28 emanating from jets 26 are directed radially inwardly, so as to pass through layers 20, 16, and 12, and inwardly of image transfer device 10 through the foraminous image forming surface thereof. It should be noted that the specific number of rows of jets is not critical to the present invention, nor is it necessary that each row of jets discharge the water at the same pressure. The water passes from image transfer device 10 through line 30, and is subsequently processed and recycled.

It should be understood that the pressure of jet streams may be progressively increased from jet row to jet row, so that layers 20, 16, and 12 are exposed to constantly increasing water pressure. Alternatively, groups (one through four) of rows of jets may have the same water pressure, but the last jet or groups of rows of jets will have a higher water pressure than the first row of jets or groups of rows of jets.

As the high pressure streams pass through layers 20, 16 and 12, a substantial number of the thermal bond points of the thermally bonded fibrous layer 20 are split. The free fibers are then forced, by the pressure of the water jets, into and through the openings in the interior scrim layer 16. These fibers then entangle and become interlocked with fibers and filaments of the entangled fibrous layer 12 on the opposite side of the scrim 16. As a result of such mechanical disruption of the bond sites in the thermal bond layer 20, the remaining portion of the bond sites are rendered indistinct in the final composite, while still providing some residual stability to the thermal bond layer 20. The scrim layer 16 is mechanically held in place by the fiber and filament lengths driven through the scrim and finally engaged in an interlocking relationship with fibers in the entangled fibrous layer. Further, the high pressure water jet streams force the entangled fabric layer 12 against the surface of the imaging device 10 so that the image is imparted to at least the surface layer 12. In some combinations of layers, the image is imparted to the entire composite, such that all three layers assume a new dimensional configuration influenced by the design on the imaging device 10.

The thus-formed composite fabric 32 is passed to a dewatering station 34, where vacuum from line 36 is applied to one or both sides of the composite to remove excess water therefrom. The dried composite fabric 32 then passes to a post-treatment station, where chemical(s) from line 40 may be applied to one or both sides of the composite fabric. The dried and chemically treated composite then passes to station 42, where further finishing steps, such as drying, curing, heat-setting, etc. may be performed. The finished laminated product is then wound upon roll 44 for subsequent storage and shipment.

Figure 2:
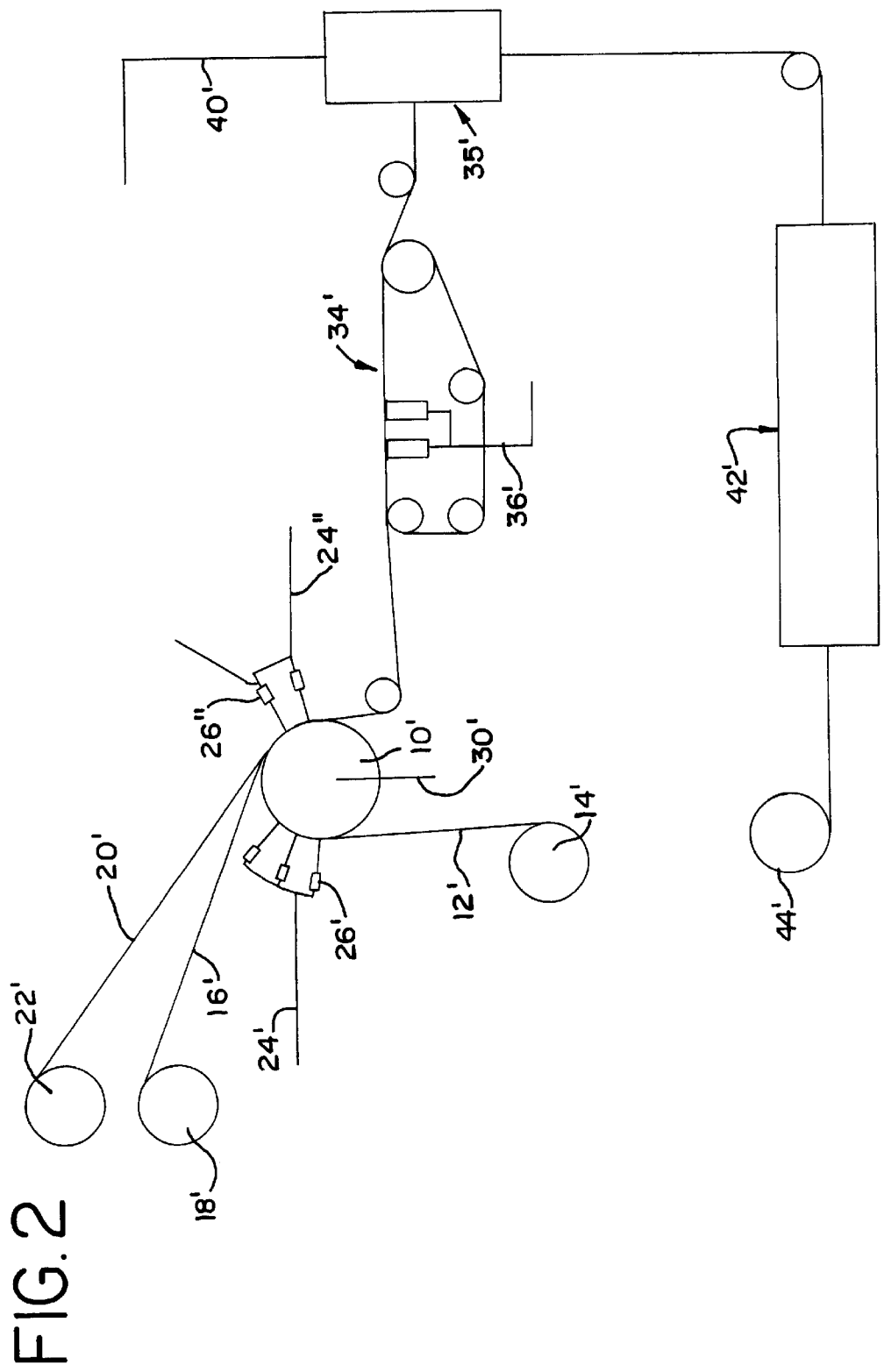
FIG. 2 is a schematic view of another embodiment of the invention.
Figure 3:
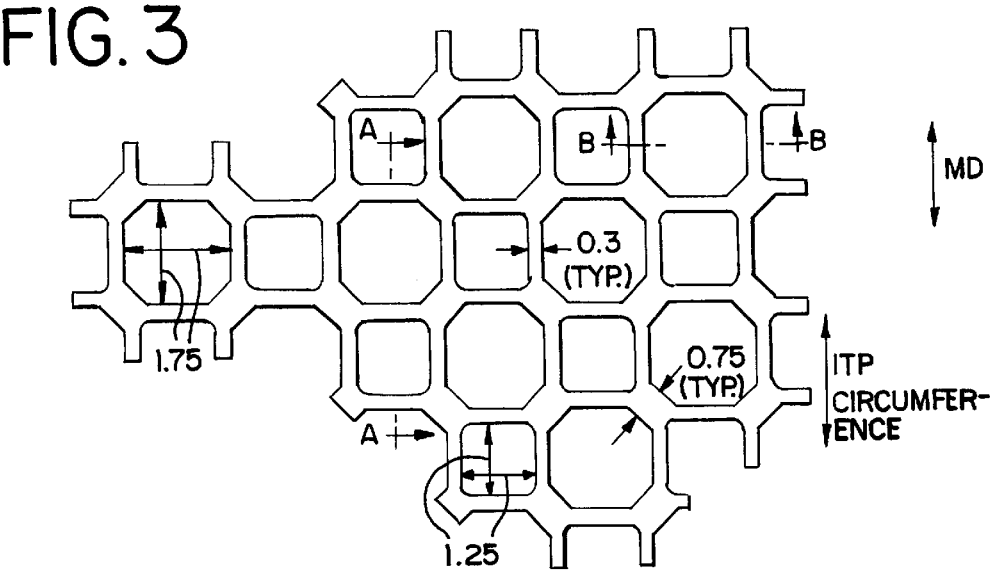
FIG. 3 is a diagrammatic view of a three-dimensional imaging device.
Figure 3A:
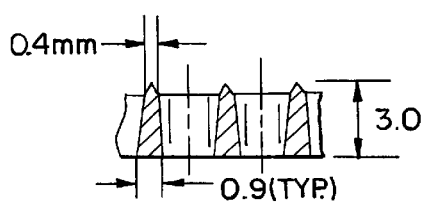
FIG. 3A is a cross-section view taken generally along line A—A of FIG. 3.
Figure 3B:
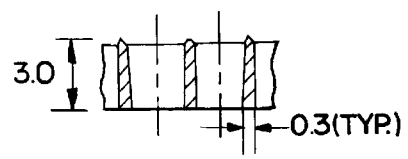
FIG. 3B is a cross-sectional view taken generally along line B—B of FIG. 3.
Figure 3C:
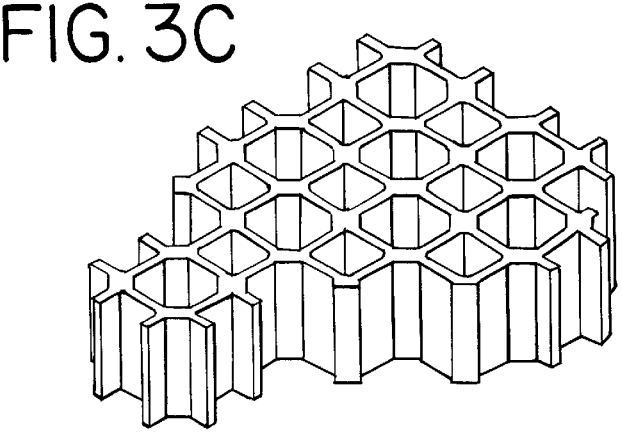
FIG. 3C is a perspective view of the three-dimensional imaging device shown in FIG. 3.

Referring now to FIG. 2, another embodiment of the process of the invention is illustrated therein. Primed reference numerals have been used in FIG. 2 to designate elements that correspond to common elements of the embodiment of FIG. 1, and the description of such common elements will not be repeated herein. The arrangement of FIG. 1 is particularly useful for polyester scrims; where post-treatments such as dying, heat setting, etc. are desirable or necessary. Polyester scrims ranging from about 1 mesh to about 12 mesh (equivalent deniers from about 10 to about 500) can be processed in accordance with the arrangement of FIG. 1. For coarser scrims (higher deniers) the arrangement of FIG. 2 is preferred.

In accordance with the arrangement of FIG. 2, high pressure water from line 24' is fed to the rows of high pressure water jets 26' to impart the image of imaging device 10' into entangled layer 12'. By feeding entangled layer 12' to the imaging device 10' upstream of scrim layer 16' and thermally bonded layer 20', the scrim will not interfere with the imaging of entangled layer 12' so that the imaged entangled layer 12' will be effective in hiding or masking the scrim in the final composite product.

The scrim layer 16' and thermally bonded layer 20' are fed to image transfer device 10' downstream of the rows of high pressure water jets 26' and are laminated to the already imaged entangled layer 12' by high pressure water fed from line 24" to the rows of high pressure water jets 26". While two such rows of high pressure water jets 26" are illustrated in FIG. 2, the number may vary, so long as the rows of high pressure water streams are effective in driving fibers or filaments of the thermally bonded layer through the mesh openings in scrim 16' and into mechanical interlocking relationship with the previously imaged layer 12'. By using the arrangement of FIG. 2, the scrim layer 16' will not interfere with the imaging of entangled fiber layer 12' and the scrim layer will not be readily visible in the finished product.

Figure 4A:
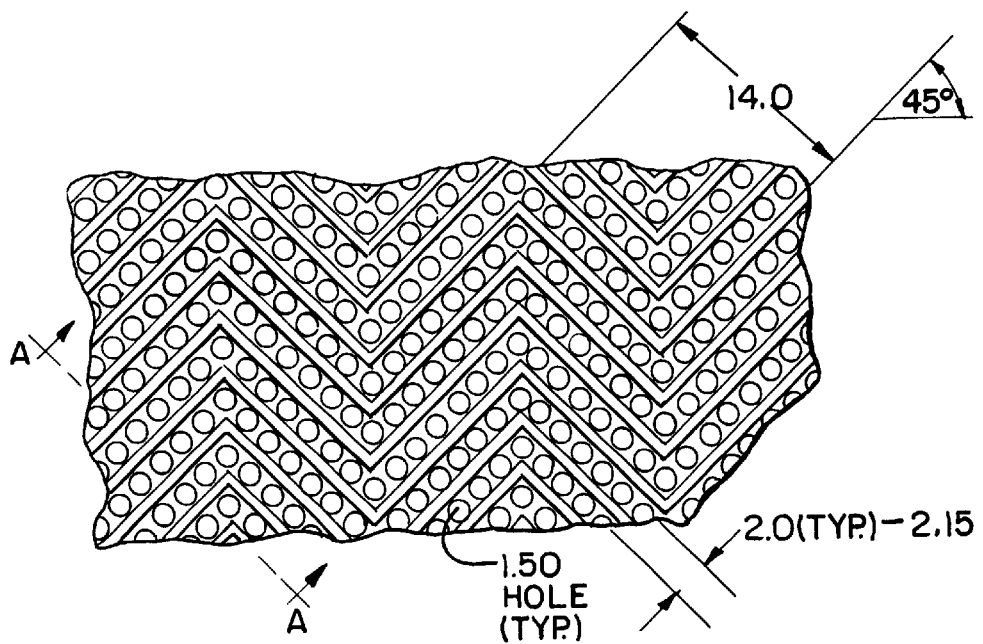
FIG. 4a is a cross-sectional view taken generally along line A—A of FIG. 4.
Figure 4B:
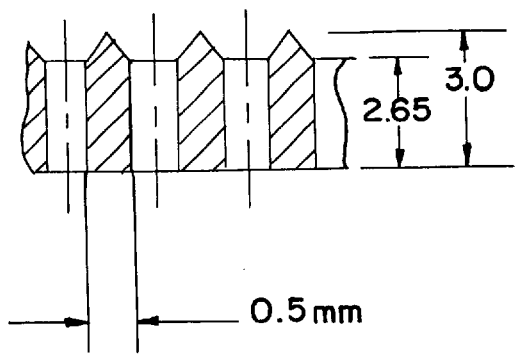
FIG. 4 is a diagrammatic view of another form of a three-dimensional imaging device.

The imaging device 10, 10' may be a cylindrical drum, as shown, or the flat run of an imaging belt trained over two spaced apart guide rolls. The imaging surface may be formed in accordance with the teachings of U.S. Pat. Nos. 5,098,764, 5,244,711, 5,674,587, and 5,674,591, incorporated herein by this reference. Alternatively, the imaging device 10, 10' may have the "octagon/square" pattern illustrated in FIGS. 3 and 3A–3C, or the "herringbone" pattern illustrated in FIGS. 4A and 4B and described in detail in U.S. Pat. No. 5,736,210. also incorporated herein by this reference.

EXAMPLE 1

A composite nonwoven fabric was formed with the arrangement of FIG. 1, wherein the imaging device 10 had an "octagon/square" imaging surface such as is illustrated in FIGS. 3 and 3A–3C. The entangled layer 12 was produced using 1.5 denier polyester staple fibers at 1.5 inch staple length which were carded, crosslapped and entangled using a Perfojet 2000 Jetlace entangler. The PET scrim layer 16 was a 7×5mesh, 70 denier scrim available from Conwed Plastics of Minneapolis, Minn. A thermally bonded, 2.0 denier polyester thermally bonded fibrous layer was used as the bonded layer 20, with a 50 gsm target basis weight.

The fibrous layers were unwound at 40 feet per minute and impinged with three successive rows of jets 26 each operating at 4000-psi pressure. Each row of jets 26 had 120-micron diameter orifices spaced at 42.3 orifices per inch.

The image was imparted to the entire composite structure such that the thermally bonded substrate and the entangled substrate were bonded to each other through the scrim layer and could not be delaminated. The extent of such inter-layer entanglement is depicted in FIG. 5. The penetration of the black spunbond filaments through the opposing entangled fibrous layer can be observed in the photomicrograph of the cross-section of the fabric provided in FIG. 5.

EXAMPLE 2

In example 2, another composite fabric was produced as described for Example 1 except that a 5×5 mesh, 70-denier scrim also from Conwed was used. As for example 1, the entire composite exhibits the image obtained from the image transfer device and again the layers cannot be delaminated without destroying the fully integrated structure of the composite. Additional evidence of the degree of entanglement of the opposing fibrous layers is observed in FIG. 6, wherein lengths of black filaments from the thermally bonded fibrous layer can be observed at the surface of the entangled layer.

What is claimed is:

1. A method of forming a nonwoven laminate comprising the steps of:

providing an image transfer device having a three-dimensional imaging surface; providing an entangled fibrous layer against the three-dimensional imaging surface of said image transfer device; supplying an open mesh scrim to said image transfer device adjacent said entangled fibrous layer; supplying a thermally bonded fibrous layer to said image transfer device adjacent said open mesh scrim; and applying high pressure fluid jets to said thermally bonded fibrous layer at said image transfer device; said high pressure fluid jets providing consolidation of the laminate by resulting in the entangling of at least 35 percent of the fibers or filaments of the thermally bonded fibrous layer with fibers of the entangled fibrous layer through the open mesh scrim layer; said high pressure fluid jets further imparting the image of said imaging transfer device, in which said entangled fibrous layer is supplied to said imaging surface upstream of said scrim and said thermally bonded fibrous layer, and wherein high pressure fluid jets are applied to said entangled fibrous layer to impart an image, followed by juxtaposition of said scrim and said thermally bonded fibrous layer and application of a second set of high pressure fluid jets are applied to the combined layers to produce the composite structure.

2. The method of claim 1 in which said scrim and thermally bonded fibrous layer are fed to said imaging surface at a common location, and wherein said high pressure fluid jets are applied to said entangled fibrous layer, scrim and thermally bonded fibrous layer simultaneously at said common location.

3. A method of forming a nonwoven laminate comprising the steps of:

providing an image transfer device having a three-dimensional imaging surface; providing an entangled fibrous layer against the three-dimensional imaging surface of said image transfer device including applying high pressure fluid streams to said fibrous layer to form said entangled fibrous layer; supplying an open mesh scrim to said image transfer device adjacent said entangled fibrous layer after said application of high pressure fluid streams thereto; supplying a bonded fibrous layer to said image transfer device adjacent said open mesh scrim; and applying high pressure fluid jets to said thermally bonded layer at said image transfer device; said high pressure fluid jets providing consolidation of said laminate by causing the co-mingling and entangling of at least 35 percent of the fibers or filaments of the bonded layer with fibers of the entangled layer through the open mesh scrim layer such that said open mesh scrim layer is mechanically retained between said entangled fibrous layer and said bonded fibrous layer.

4. The method of claim 3 wherein said bonded fibrous layer is thermally bonded.

5. The method of claim 4 wherein said thermally bonded fibrous layer is formed of thermoplastic fibers.

6. The method of claim 4 wherein said thermally bonded fibrous layer is formed of thermoplastic filaments.

7. A method of forming a nonwoven laminate, comprising the steps of:

providing a fibrous layer;

applying high pressure fluid streams to said fibrous layer to form an entangled fibrous layer;

providing an open mesh scrim, and positioning said open mesh scrim on top of said entangled fibrous layer;

providing a bonded fibrous layer and positioning said bonded fibrous layer on top of said open mesh scrim and said entangled fibrous layer, and hydroentangling said bonded fibrous layer, said open mesh scrim, and said entangled fibrous layer to form said nonwoven laminate.

8. A method of forming a nonwoven laminate in accordance with claim 7, wherein:

said bonded layer comprises a thermally bonded layer.

* * * * *